(12) United States Patent
Koyama et al.

(10) Patent No.: US 6,815,853 B2
(45) Date of Patent: Nov. 9, 2004

(54) STATOR STRUCTURE FOR A RESOLVER

(75) Inventors: Takanobu Koyama, Tokyo (JP); Naofumi Kumagai, Tokyo (JP)

(73) Assignee: Minebea Co., Ltd., Nagano-Ken (JP)

( * ) Notice: Subject to any disclaimer, the term of this patent is extended or adjusted under 35 U.S.C. 154(b) by 0 days.

(21) Appl. No.: 10/715,838

(22) Filed: Nov. 19, 2003

(65) Prior Publication Data

US 2004/0150275 A1 Aug. 5, 2004

(30) Foreign Application Priority Data

Nov. 20, 2002 (JP) ........................................ 2002-336407

(51) Int. Cl.[7] .............................................. H02K 5/04
(52) U.S. Cl. ........................................ 310/71; 310/254
(58) Field of Search ........................... 310/71, 216, 254

(56) References Cited

U.S. PATENT DOCUMENTS

| | | | |
|---|---|---|---|
| 4,132,460 A | | 1/1979 | Porta ....................... 339/119 R |
| 5,389,846 A | | 2/1995 | Okazaki et al. ....... 310/40 MM |
| 5,920,135 A | * | 7/1999 | Ohshita ....................... 310/71 |
| 6,028,383 A | * | 2/2000 | Ohshita ....................... 310/71 |
| 6,724,109 B2 | * | 4/2004 | Mimura ....................... 310/71 |

FOREIGN PATENT DOCUMENTS

| | | | |
|---|---|---|---|
| EP | 56088638 | 7/1981 | ............ H02K/3/50 |
| EP | 61121737 | 6/1986 | ............ H02K/3/52 |
| EP | 61218339 | 9/1986 | ............ H02K/3/50 |
| EP | 04049826 | 2/1992 | ............ H02K/3/50 |
| EP | 05146106 | 6/1993 | ............ H02K/3/52 |
| EP | 06022495 | 1/1994 | ............ H02K/5/22 |
| JP | H10-309067 | 11/1998 | .......... H02K/24/00 |

* cited by examiner

Primary Examiner—Dang Le
Assistant Examiner—Nguyen Hanh
(74) Attorney, Agent, or Firm—Adduci, Mastriani & Schaumberg, LLP

(57) ABSTRACT

A stator core 1 is surrounded by a first insulating member 40 and a second insulating member 41. Locking protrusions 9 are formed on the outer periphery of the stator core 1, and the locking protrusions 9 form a keyway 11. A modular connector 2 includes a key part 21 that fits within the keyway 11 to secure the modular connector 2 to the stator core 1. Fastening pins 18 are embedded in the modular connector 2 to conduct electricity from a mating connector 91 and a lead line 93 to the resolver.

16 Claims, 7 Drawing Sheets

STATOR STRUCTURE FOR A RESOLVER

CROSS REFERENCE TO RELATED APPLICATION

This application is based on and incorporates by reference Japanese Patent Application No. 2002-336407 which was filed on 20 Nov. 2002.

BACKGROUND OF THE INVENTION

The present invention relates to stator structures of resolvers, and more particularly, to a stator structure of a resolver that includes a modular connector that resists breakage and inadvertent removal.

In conventional resolver stator structures, lead lines with connectors have been manually connected to the terminal lines of stator coils, and it has been difficult to automate the assembly of stator structures. The lead line connector parts have been stacked on top of the stator coil lines, which has had a negative impact on the characteristics of the resolver. A resolver stator structure such as that of FIGS. 11 and 12 has been proposed for solving this problem. FIGS. 11 and 12 are from published Japanese patent application H10-309067.

The inside of a multilayer iron core 100 is fabricated with multiple alternating tooth parts 200 and slots 300 as shown. Stator coil wires 500 are wound onto each of the tooth parts 200 on top of a well-known insulating member 400, which is known as an insulating cap. The insulating member 400 is annular and which has parts that protrude in correspondence with each of the tooth parts 200. The stator coil wires 500 are electrically insulated from each of the tooth parts 200 of the iron core 100.

An insulating extension 109, which extends radially with respect to the iron core 100 as shown, is integral with the insulating member 400. Multiple pins 110 are embedded in the insulating extension 109. A lead line 700, which is fixed to a connector 600, is connected to a terminal part 118 of the pins 110. The terminal ends of the stator coil wires 500 are connected to the pins 110. The connection of the pins and the stator coil wires is performed by an automated machine, not shown. A cover 129, for covering the pins 110, is provided on the insulating extension 109 such that the cover 129 can easily be attached and removed.

An annular coil cover 139 is located on the stator coil wire 500, and the coil cover 139 includes a notched part 138, which corresponds to the insulating extension part 109. When the resolver stator structure according to FIGS. 11 and 12 is assembled automatically, the coil wires 500 are applied to each of the tooth parts 200 after the insulating member 400, which includes the insulating extension part 109, is attached to the iron core 100. Then, the terminal ends of the coil wires 500 are connected to the various pins 110, and the coil wire cover 139 is installed. The stator structure can be assembled automatically by having the various processes described above performed by automated equipment.

In this resolver stator structure, pins are embedded in the insulating extension 109. The insulating extension 109 is fabricated to be integral with the insulating member 400, which is located between the iron core 100 and the coil wires 500. The coil wires 500 are connected to the pins 110, making it possible to automate the assembly of the stator structure. However, the conventional stator structure has been a structure in which pins are embedded in the insulating extension 109, which is integral with the insulating member 400. In order to make the resolver smaller and thinner, the parts that connect with the insulation extension 109, have been made thin.

Because of this, the insulating extension 109 is susceptible to fracture at the junction between the insulation extension and the insulating member 400 when an external force is applied to the stator. Furthermore, the fact that the insulating member and the insulating extension parts have been fabricated as an integral member has required that the insulating member 400 and the insulating extension 109 be of the same material. Therefore, a different material cannot be used for the insulating extension 109 even if such material is more appropriate for a connector. In addition the material limits the shape of the parts, which is a factor in the cost of the resolver.

SUMMARY OF THE INVENTION

An object of the invention is to provide a resolver stator structure that lowers the cost of manufacture and in which the insulating extension parts are strongly resistant to removal, which improves reliability.

Basically, the invention is a stator structure for a resolver including stator core. The stator core includes protrusions that extend outwardly from a center of the stator core, and the protrusions are shaped such that a keyway is formed between the protrusions. The stator core structure includes a connector module, and the connector module includes pins for conducting electricity to the resolver. The connector module includes a key part, the shape of which conforms to the shape of the keyway, and the key part is fitted into the keyway for attaching the connector module to the stator core.

In another aspect of the invention, the resolver includes a first insulating member, which is located on a first side of the stator core, and a second insulating member, which is located on a second side of the stator core. The first side of the stator core is opposite to the second side of the stator core, and the first and second insulating members surround the stator core.

In another aspect, the connector module is mated with a socket to electrically connect a lead line to the resolver.

In another aspect, the connector module includes a fastener for fastening the connector module to one of the insulating members.

In another aspect, the fastener, when fastened, prevents the connector module from moving within the keyway.

In another aspect, distal ends of the protrusions are angled toward one another to form the keyway.

In another aspect, the connector module includes a stop member that abuts against the protrusions when the connector module is attached to the stator core. The stop member prevents movement of the key part within the keyway.

In another aspect, the stator core includes a plurality of plates that are stacked, and more than one of the plates includes protruding members that form the protrusions.

In another aspect, the resolver core is generally circular and has a central axis. The connector module has a longitudinal axis that is perpendicular the central axis of the stator core.

BRIEF DESCRIPTION OF THE DRAWINGS

The accompanying figures, in which like reference numerals refer to identical or functionally similar elements throughout the separate views and which, together with the detailed description below, are incorporated in and form part of the specification, serve to further illustrate various embodiments and to explain various principles and advantages all in accordance with the present invention.

DETAILED DESCRIPTION OF THE PREFERRED EMBODIMENTS

Figure 1:
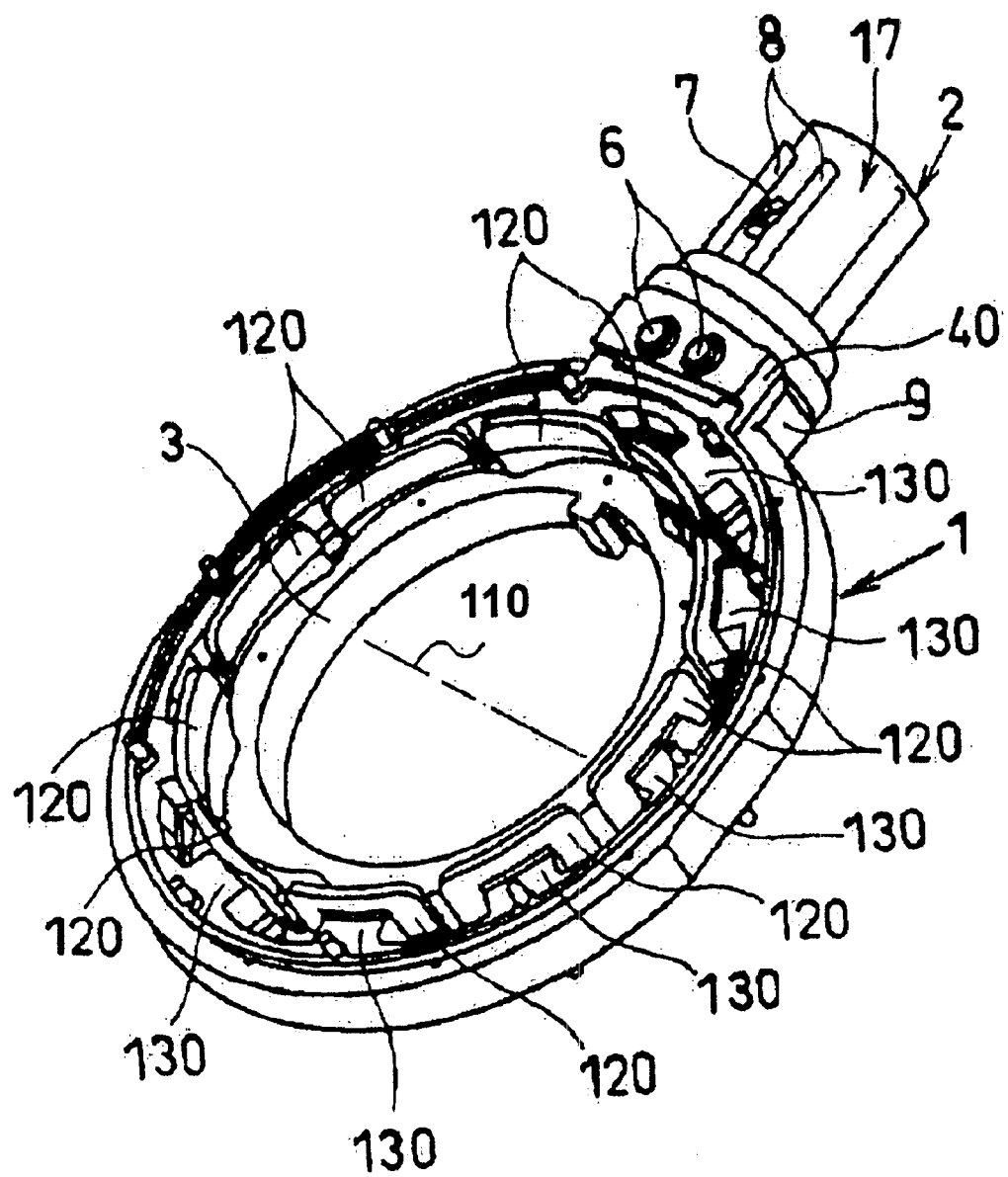
FIG. 1 is a perspective view of a stator structure according to one embodiment of the present invention.

Referring to FIG. 1, a rotor 3 is equipped on the inside of a stator stack (stator core) 1. A first insulating member 40 lies on one side of the stator core 1 and a second insulating member 41 lies on the opposite side of the stator core 1. In other words, the insulating members 40, 41 surround the stator core 1. Protrusions 9 are formed on the outer periphery of the stator core 1, and as will be described below, and a lead line connector module 2 fits on the protrusion parts 9.

Figure 9:
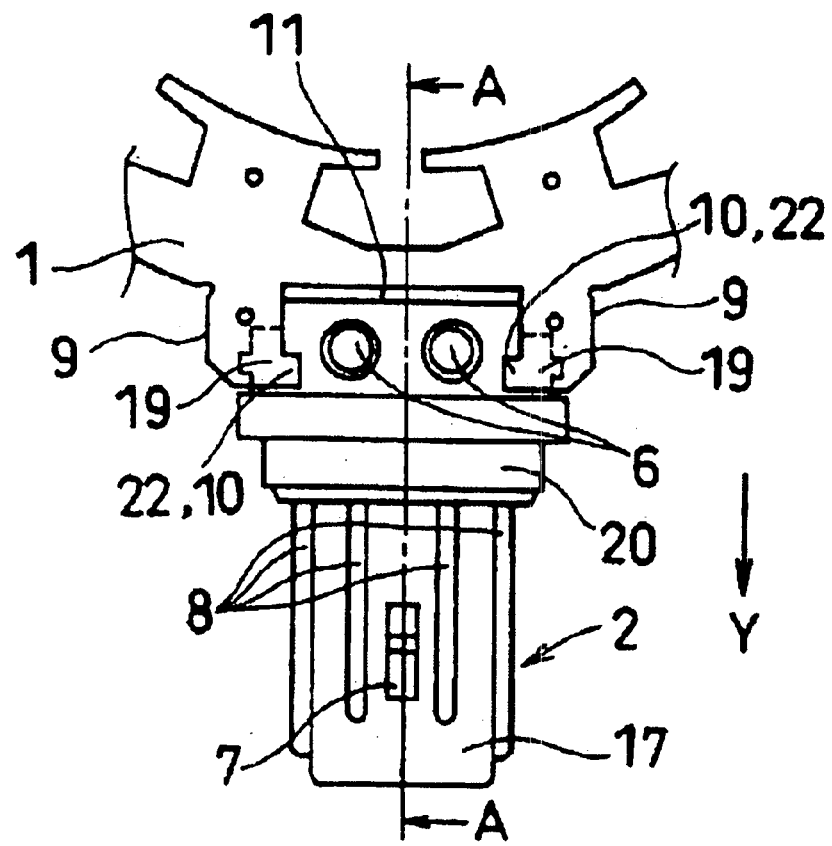
FIG. 9 is a partial, enlarged front view of the stator structure of FIG. 1 and of a mating connector.
Figure 9:
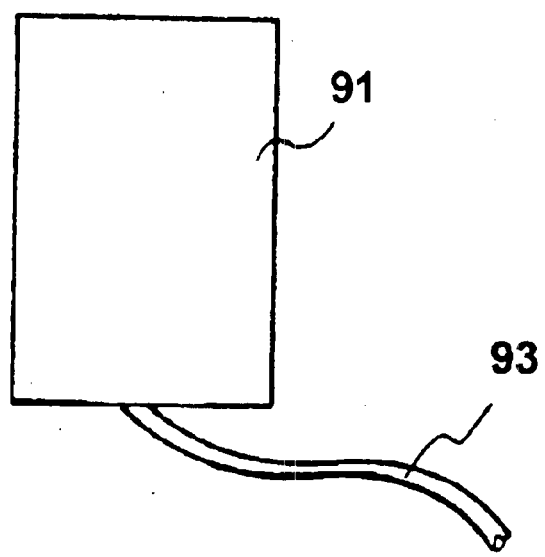

The lead line connector module 2 is provided with a cylindrical part 17, which mates with a mating socket connector 91 (shown in FIG. 9). Also, the cylindrical part 17 is fabricated with guides 8 and mating protrusion parts 7 to facilitate the fitting and mating with the socket 91. Furthermore, projections 6, which mate with the first insulating member 40, are fabricated on the lead line connector module 2. The projections 6 serve as fasteners for fastening the modular connector 2 to the first insulating member 40.

Figure 2:
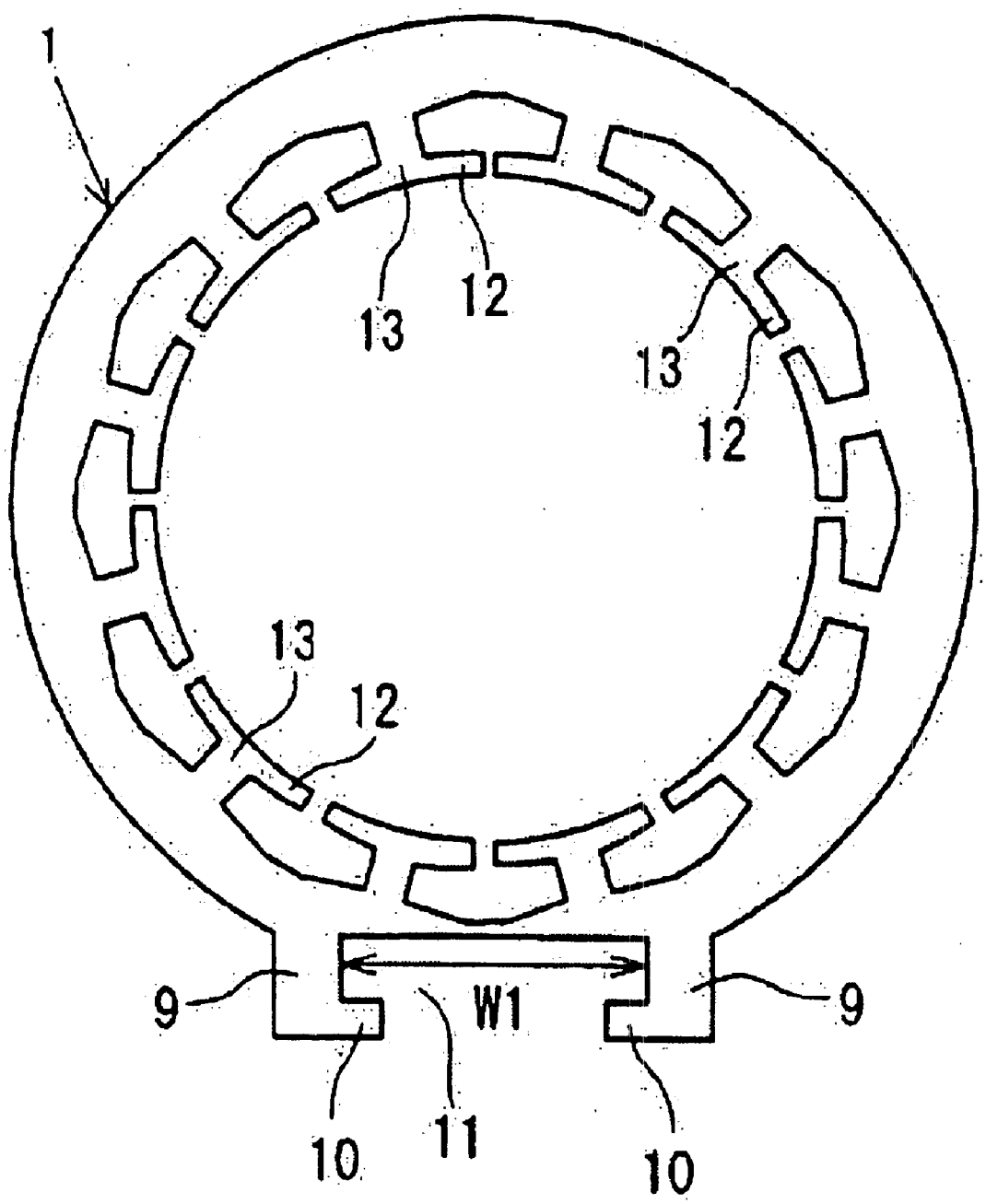
FIG. 2 is a plan view of a stator core of the stator structure of FIG. 1.

The stator core 1 is fabricated by stacking multiple plate-shaped members, one of which is visible in FIG. 2. Stator magnetic poles 13, from which multiple stator magnetic pole teeth 12 extend, are formed about the inner surface of the core members. Each magnetic pole 13 is part of a stator magnet.

Locking protrusions 9 are fabricated on the outer periphery of the stator core 1. Distal ends 10 of the locking protrusions 9 are turned inward toward one another to form a key shaped slot, or keyway 11, and the lead line connector module 2 fits into the keyway 11 in a direction that is perpendicular to the plane of the paper in FIG. 2, as explained in more detail below. In other words, the keyway 11 has an axis that is parallel to the central and rotational axis 110 of the resolver.

Figure 3:
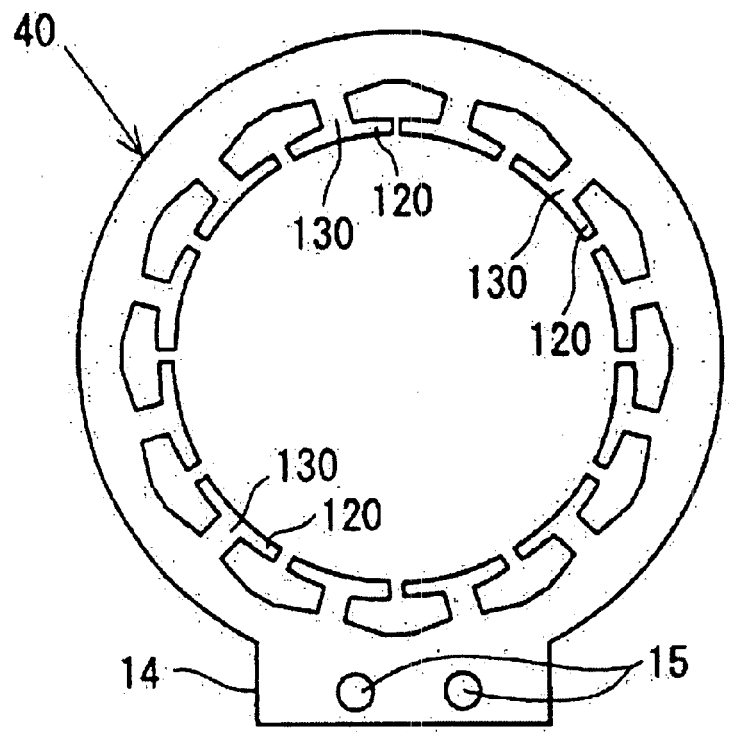
FIG. 3 is a plan view of a first insulating member of the stator structure of FIG. 1.

As is shown in FIG. 3, the first insulating member 40 includes wire coil protection parts 130 and rim parts 120, which are located in correspondence with the stator magnetic poles 13 and the stator magnetic pole teeth 12 of the stator core 1. Furthermore, a lug 14 is fabricated on the outer peripheral side of the first insulating member 40, and holes 15 are formed to pass through the lug 14. The holes 15 are located to oppose the projections 6, which are fabricated on the lead line connector module 2, and the projections 6 fit into the holes 15, respectively, when the resolver stator structure is assembled.

Figure 4:
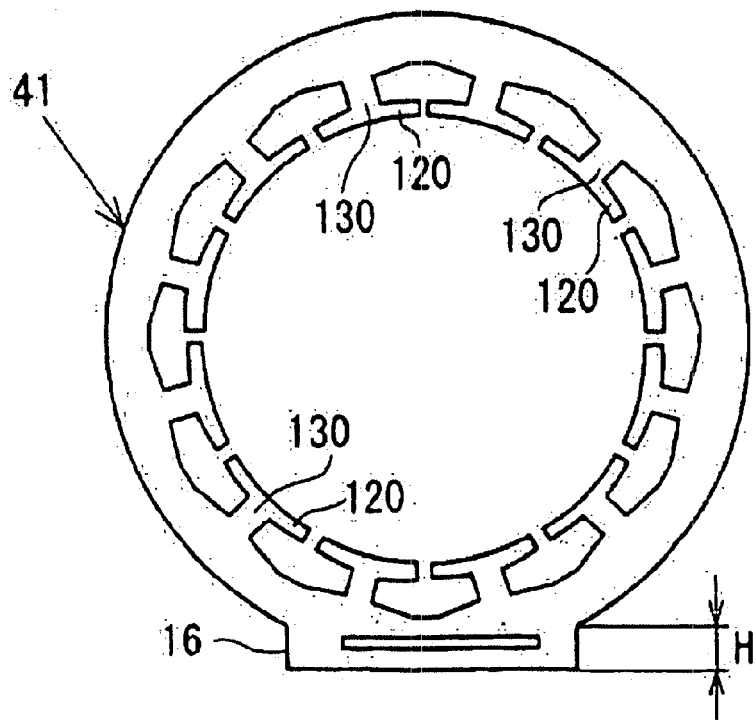
FIG. 4 is a plan view of a second insulating member of the stator structure of FIG. 1.

As is shown in FIG. 4, the second insulating member 41 is fabricated with coil wire protection parts 130 and rim parts 120 in locations corresponding to the stator magnetic poles 13 and the stator magnetic pole teeth 12 of the stator core 1. Furthermore, a lug 16 is formed on the periphery of the second insulating member 41. The lug 16, as is shown in FIG. 1, the length H of the lug 16 is such that the lug 16 does not interfere with a stop member 19, which is formed on the lead line connector module 2, when the resolver stator is assembled. The stop member 19 is described below.

The lead line connector module 2, which is shown in FIGS. 5–8, is made of a material that is different from that of the first and second insulating members 40, 41. For example, the lead line connector module 2 may be made of Teflon (trademark) and the first and second insulating members 41, 42 may be made of another insulating material. Therefore it is possible to use a material for the lead line connector module 2 that is stronger and has a lower coefficient of friction than the material of the first and second insulating members 40, 41. This provides an increased degree of freedom because the shape is less constrained by the material, and the cost of the resolver can be decreased as well.

In the lead line connector module 2, the cylindrical part 17 is secured to an outer side of a base part 20. Longitudinal guides 8, to guide the fitting of the socket 91 onto the cylindrical part 17 and to facilitate the mating of the two, are formed on the outer surface of the cylindrical part 17. A fitting projection 7, which secures the socket 91 to the lead line connector module 2, is fabricated on the outside of the cylindrical part 17.

Cooperating grooves and a recess are fabricated in the socket 91 in positions corresponding to the guides 8 and the fitting projection 7, respectively. Furthermore, the projections 6, which fit in the holes 15 of the first insulating member 40, are fabricated on the lead line connector module 2. In addition, fastening pins 18, which are connected to a stator coil 95 (shown in FIG. 9), are embedded within the lead line connector module 2. A mating part 23, which engages with the locking protrusions 9 of the stator core 1, is fabricated on the inner side of the base part 20. The mating part 23 includes the stop member 19 and a key part 21.

Figure 10:
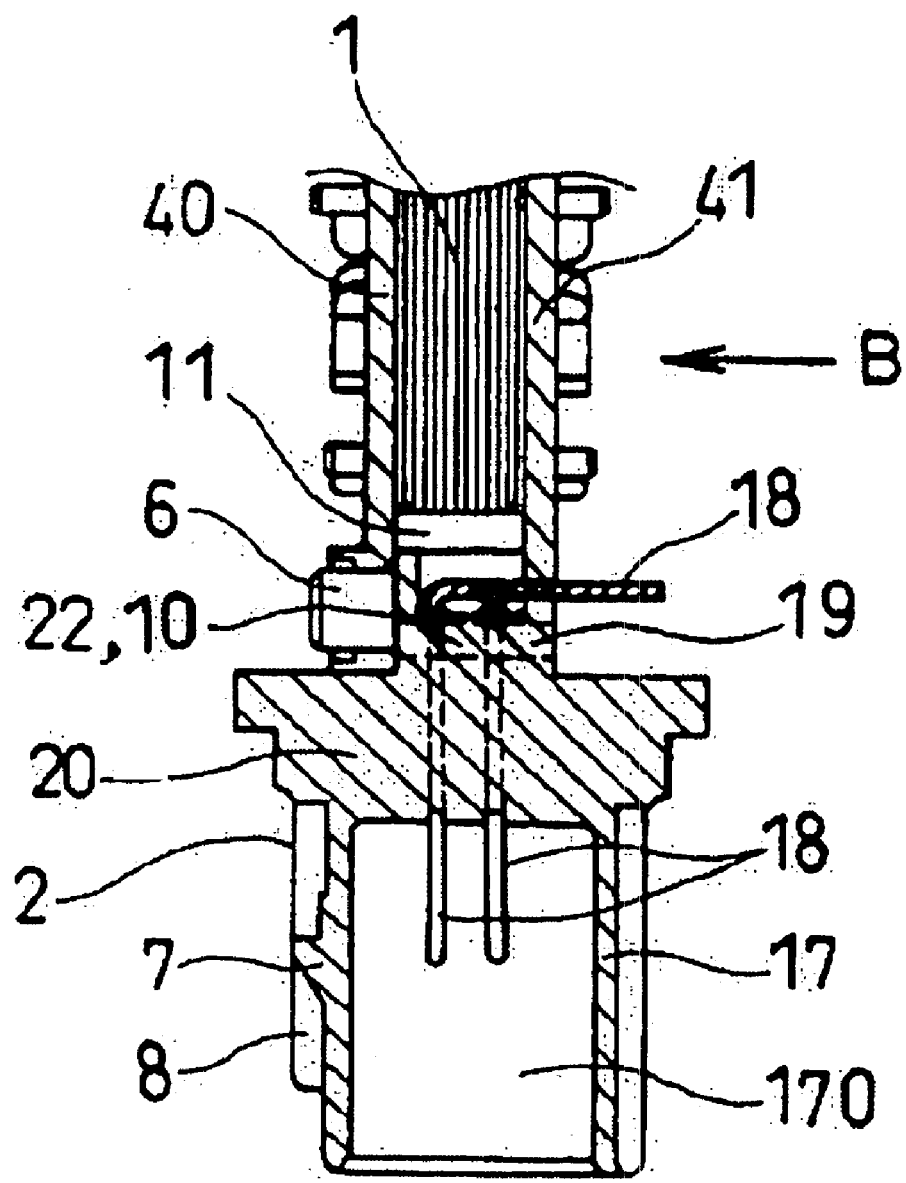
FIG. 10 is a partial cross sectional right side view of the structure of FIG. 9.
Figure 11:
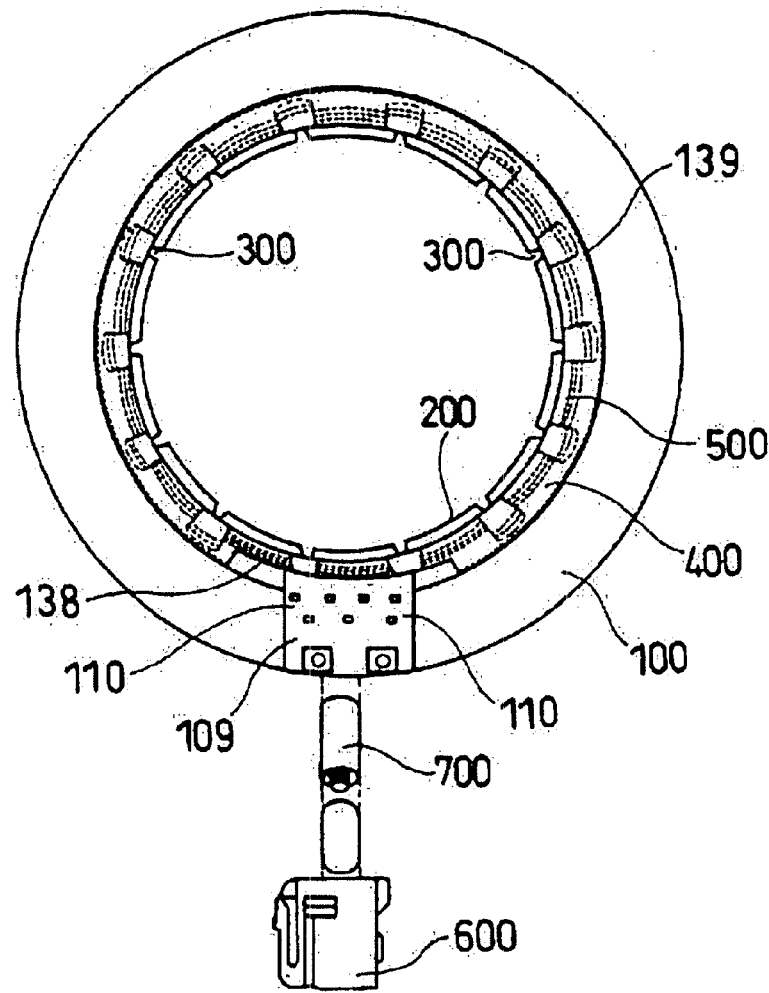
FIG. 11 is a plan view of a conventional resolver stator structure.
Figure 12:
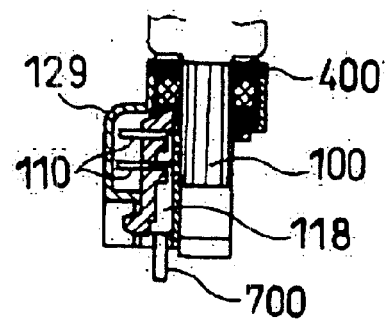
FIG. 12 is a cross sectional view of an insulating extension part of the resolver stator structure of FIG. 11.

The stop member 19 is located in correspondence with the second insulating member 41, as shown in FIG. 10. The width W3 of the stop member 19 (see FIG. 7) is greater than the distance W1 between the locking protrusions 9, as shown in FIG. 9. The height H2 of the stop member 19 is such that the lug 16 on the outer peripheral side of the second insulating member 41 barely contacts the stop member 19 when the lead line connector module 2 is installed.

The fastening pins 18 pass through the base part 20 and are angled by 90 degrees, as shown in FIG. 10. The fastening pins 18 fit into grooves 27, which are formed on the inner surface of the stop member 19. Stator coil wires (magnetic inductance coil wires and output coil wires wrapped on the stator magnetic poles 13) are coupled to the fastening pins 18. When the socket 91 is mated with the connector module 2, the fastening pins 18 are connected to lead lines 93 which extend from the socket 91.

The key part 21 is essentially a T-shaped standing wall (See FIG. 6), which is adjacent to the stop member 19. The fastening pins 18 are surrounded by the key part 21. The key part 21 is located to correspond with the first insulating member 40, as shown in FIG. 10. The fastening pins 18 are embedded within the block-like structure formed by the key part 21 and the stop member 10.

Figure 8:
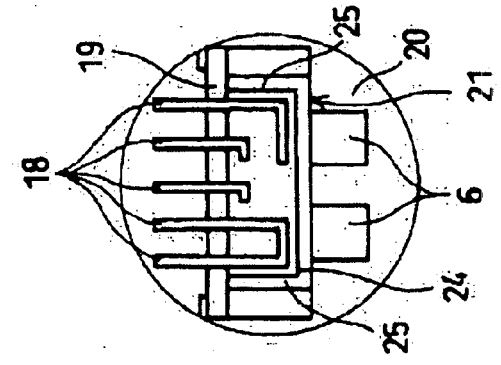
FIG. 8 is a top plan view of the connector module of FIG. 6.
Figure 7:
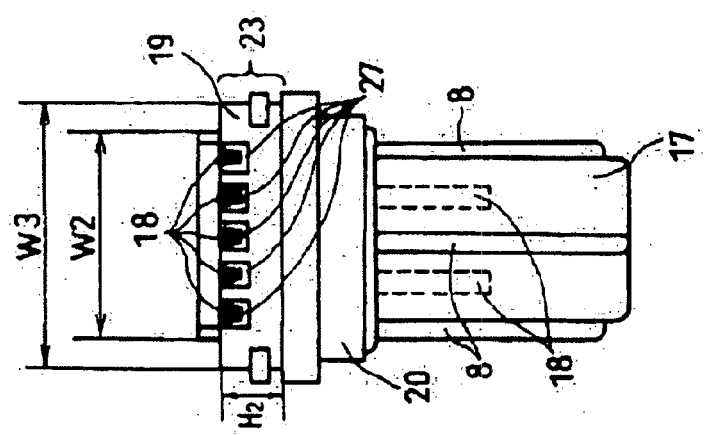
FIG. 7 is a rear view of the connector module of FIG. 5.
Figure 6:
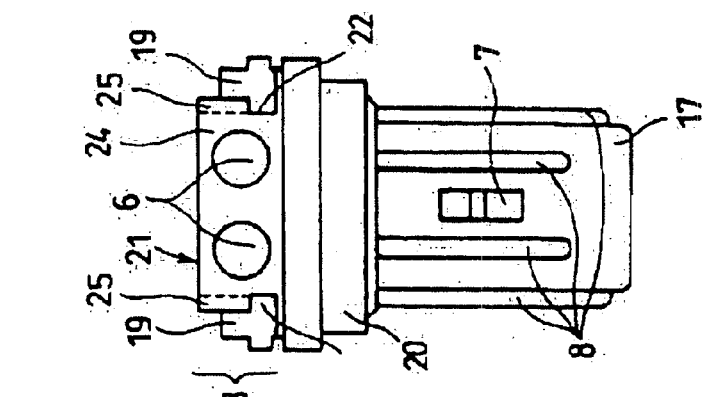
FIG. 6 is a front view of the connector module of FIG. 5.
Figure 5:
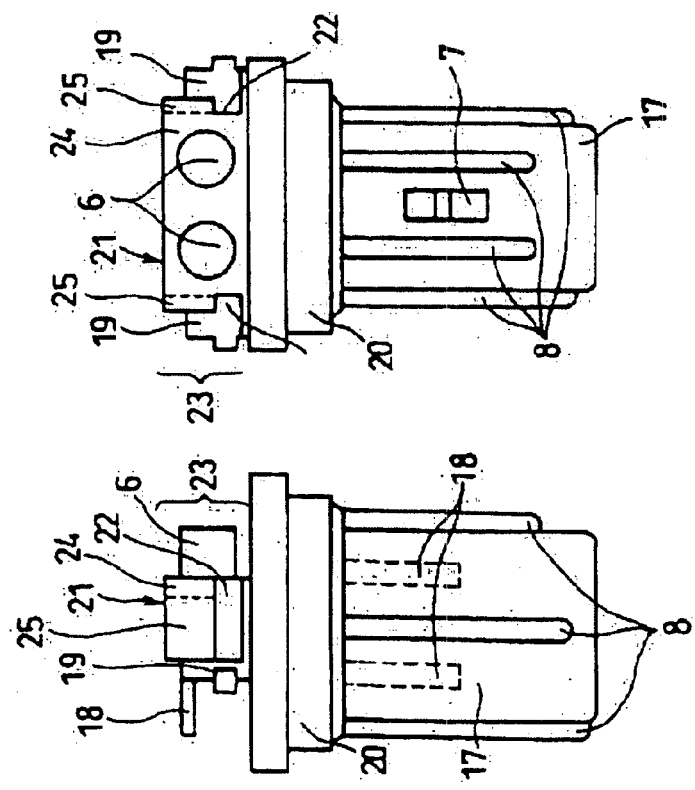
FIG. 5 is a left side view of a connector module of the stator structure of FIG. 1.

The projections 6, which mate with the second insulating member 40, are formed on a wall 24 of the key part 21. The protrusions are located on an opposite side of the connector module 2 from where the fastening pins 18 protrude, as shown in FIGS. 5 and 8. The projections 6 fit into the holes 15 of the first insulating member 40, and also the distal ends of the projections 6 are compression fused to secure the first insulating member 40 and the lead line connector module 2 when the connector module 2 is attached to the stator core 1.

Opposed ears 25, which are parts of the wall 24, abut against the stop member 19 when the connector module is attached to the stator core 1. Beneath the ears 25 are a pair of respective grooves 22. When the key part 21 is fitted into the keyway 11, which is formed by the locking protrusions 9. When the connector module 2 is fitted to the stator core 1, the distal ends 10 of the locking protrusions 9 fit into the grooves 22, as shown in FIG. 9.

FIGS. 9 and 10 illustrate the lead line connector module 2 fitted to the stator core 1. The lead line connector module 2 is fitted to the stator core 1 from the B direction in FIG. 10. That is, the lead line connector module 2 is fitted into the keyway 11, and the grooves 22 receive the distal ends 10 of the locking protrusions 9. The connector module enters the keyway 11 until the stop member 19 contacts the locking protrusions 9 of the stator core 1. The result is that the engagement between the grooves 22 and the distal ends 10 of the locking protrusions 9 firmly resists force in the direction Y, which is indicated by an arrow in FIG. 9. That is, the engagement between the grooves 22 and the distal ends 10 of the locking protrusions 9 resists force in a radial direction and in the direction in which the longitudinal axis of the connector module 2 extends.

The second insulating member 41 is installed on the side of the stator core 1 that is opposite to the projections 6. The first insulating member 40 is installed on the other side of the stator core 1, which is the side on which the projections 6 are located, as shown in FIG. 10. The projections 6 fit into the holes 15 in the first insulating member 40, and the distal ends of the projections 6 secure the first insulating member 40 to the lead line connector module 2 after the projections 6 are subjected to a well-known compression fusion procedure. The compression fusion operation fixes both of the insulating members. 40, 41 to the connector module 2 and the stator core 1. The result is that the lead line connector module 2 is prevented from escaping in the direction B indicated by an arrow in FIG. 10. The grooves 22 and the distal ends 10 of the locking protrusions 9 are engaged, and not only are the first insulating member 40 and the lead line connector module 2 secured by the projections 6, but the stator core 1 and the second insulating member 41 are secured to one another. Thus the lead line connector module 2 is secured and resists force in all directions.

Given the resolver stator structure of the present invention, a stator core 1 is sandwiched between two insulating members 40, 41, and locking protrusions 9 are formed on the outer periphery of the stator core. A connector module 2, which is fabricated separately from the insulating members 40, 41, mates with the locking protrusions 9. In other words, the connector module 2 is secured to the stator core 1. The first insulating member 40 and the connector module 2 are secured to one another by projections 6 formed on the connector module 2, and the stator core 1 is secured to the second insulating member 42 as well. The result is that the connector module 2, which is fitted to the stator core 1, resists forces in all directions and securely resists being pulled out as compared to the prior art example in which the insulating member 400 and the insulating extension parts 109 are fabricated as a single unit. Furthermore, because different materials are used for the insulating members 40, 41 and the connector module 2 and because the insulating members 40, 41 and the connector module 2 are fabricated separately, the materials for the lead line attachment parts can be selected according to their particular requirements, and this increases the freedom of design.

This disclosure is intended to explain how to fashion and use various embodiments in accordance with the invention rather than to limit the true, intended, and fair scope and spirit thereof. The foregoing description is not intended to be exhaustive or to limit the inventions to a the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A stator structure for a resolver comprising:

a stator core, wherein the stator core includes protrusions that extend outwardly from a center of the stator core, and the protrusions are shaped such that a keyway is formed between the protrusions;

a connector module, wherein the connector module includes pins for conducting electricity to the resolver, wherein the connector module includes a key part, the shape of which conforms to the shape of the keyway, and the key part is fitted into the keyway for attaching the connector module to the stator core.

2. The resolver stator structure of claim 1, wherein the resolver includes:

a first insulating member, which is located on a first side of the stator core; and a second insulating member, which is located on a second side of the stator core, and the first side of the stator core is opposite to the second side of the stator core, wherein the first and second insulating members surround the stator core.

3. The resolver stator structure of claim 1, wherein the connector module is mated with a socket to electrically connect a lead line to the resolver.

4. The resolver stator structure of claim 1, wherein the connector module includes a fastener for fastening the connector module to one of the insulating members.

5. The resolver stator structure of claim 1, wherein the connector module includes a fastener for fastening the connector module to one of the insulating members, wherein the fastener, when fastened, prevents the connector module from moving within the keyway.

6. The resolver stator structure of claim 1, wherein distal ends of the protrusions are angled toward one another to form the keyway.

7. The resolver stator structure of claim 1, wherein the connector module includes a stop member that abuts against the protrusions when the connector module is attached to the stator core, wherein the stop member prevents movement of the key part within the keyway.

8. The resolver stator structure of claim 1, wherein the stator core includes a plurality of plates that are stacked, and more than one of the plates includes protruding members that form the protrusions.

9. The resolver stator structure of claim 1, wherein the resolver core is generally circular and has a central axis, and the connector module has a longitudinal axis that is perpendicular the central axis of the stator core.

10. A stator structure for a resolver comprising:
   a stator core, wherein the stator core includes protrusions that extend away from a center of the stator core, and the protrusions are shaped such that a keyway is formed between the protrusions;
   a first insulating member, which is located on a first side of the stator core; and
   a second insulating member, which is located on a second side of the stator core, and the first side of the stator core is opposite to the second side of the stator core, wherein the first and second insulating members surround the stator core;
   a connector module, wherein:
      the connector module is separate from the first and second insulating members;
      the connector module includes pins for conducting electricity to the resolver; and
      the connector module includes a key part, the shape of which conforms to the shape of the keyway, and the key part is fitted into the keyway for attaching the connector module to the stator core.

11. The resolver stator structure of claim 10, wherein a projection is formed on the key part and a hole is formed in the first insulating member, and the projection fits into the hole and is fused to the first insulating member when the connector module is fitted to the stator core.

12. The resolver stator structure of claim 10, wherein the connector module is mated with a socket to electrically connect a lead line to the resolver.

13. The resolver stator structure of claim 10, wherein distal ends of the protrusions are angled toward one another to form the keyway.

14. The resolver stator structure of claim 10, wherein the connector module includes a stop member that abuts against the protrusions when the connector module is attached to the stator core, wherein the stop member prevents movement of the key part within the keyway.

15. The resolver stator structure of claim 10, wherein the stator core includes a plurality of plates that are stacked, and more than one of the plates includes protruding members that form the protrusions.

16. The resolver stator structure of claim 10, wherein the resolver core is generally circular and has a central axis, and the connector module has a longitudinal axis that is perpendicular the central axis of the stator core.

* * * * *